United States Patent
Hurley et al.

(10) Patent No.: US 9,557,232 B2
(45) Date of Patent: Jan. 31, 2017

(54) STRUCTURAL STRAIN SENSING OPTICAL CABLE

(71) Applicant: Corning Cable Systems LLC, Hickory, NC (US)

(72) Inventors: William Carl Hurley, Hickory, NC (US); David Alan Seddon, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 540 days.

(21) Appl. No.: 13/891,803

(22) Filed: May 10, 2013

(65) Prior Publication Data

US 2014/0331779 A1    Nov. 13, 2014

(51) Int. Cl.
  *G01L 1/24*    (2006.01)
  *G01M 5/00*    (2006.01)
  *G01M 11/08*   (2006.01)

(52) U.S. Cl.
  CPC ............ *G01L 1/242* (2013.01); *G01M 5/0008* (2013.01); *G01M 5/0025* (2013.01); *G01M 5/0041* (2013.01); *G01M 5/0091* (2013.01); *G01M 11/086* (2013.01)

(58) Field of Classification Search
  CPC .... G01L 1/242; G01M 5/0008; G01M 11/086; G01M 5/0041; G01M 5/0091; G01M 5/0025; G02B 6/4402; G02B 6/4433; G02B 6/441; H01B 7/32; H01B 7/041; H01B 9/005; G01K 11/32; G01K 2011/322
  USPC ................... 73/800, 874; 385/101
  See application file for complete search history.

(56) References Cited

U.S. PATENT DOCUMENTS

| | | | |
|---|---|---|---|
| 6,356,690 B1 | 3/2002 | McAlpine et al. | |
| 7,154,081 B1* | 12/2006 | Friedersdorf | G01B 11/18 250/227.14 |
| 2008/0084914 A1* | 4/2008 | Yamamoto | G01B 11/18 374/137 |
| 2010/0229662 A1 | 9/2010 | Brower | |
| 2011/0194107 A1 | 8/2011 | Hartog et al. | |
| 2011/0229099 A1 | 9/2011 | Hartog et al. | |

(Continued)

FOREIGN PATENT DOCUMENTS

| CN | 201364405 Y | 12/2009 |
|---|---|---|
| CN | 102023061 A | 4/2011 |

(Continued)

OTHER PUBLICATIONS

Chen, Stress-strain sensing optical cable, has outer protective layer inserted in hinge structure component that is provided with half tight-coated sensor unit and loose sensor unit, which is used for increasing sensing optical cable weight, Mar. 20, 2013, abstract.*

*Primary Examiner* — Lisa Caputo
*Assistant Examiner* — Brandi Hopkins
(74) *Attorney, Agent, or Firm* — William D. Doyle (57) ABSTRACT

A strain-sensing cable is provided. The strain sensing cable includes a jacket, a first optical fiber and a second optical fiber. The first optical fiber is located within the jacket and is configured to experience a strain applied to the cable and the temperature of the cable. The second optical fiber is located within the jacket and is isolated from the strain applied to the cable and is configured to experience temperature of the cable.

19 Claims, 4 Drawing Sheets

(56) References Cited

U.S. PATENT DOCUMENTS

2012/0082422 A1* 4/2012 Sarchi .................... G01K 11/32
385/101

FOREIGN PATENT DOCUMENTS

| | | |
|---|---|---|
| CN | 201885826 U | 6/2011 |
| CN | 201886828 U | 6/2011 |
| CN | 202083358 U | 12/2011 |
| EP | 2128571 A1 | 12/2009 |
| JP | 2002267424 A | 9/2002 |
| JP | 2011164074 A | 8/2011 |
| KR | 2011010316 A | 7/2009 |

* cited by examiner

STRUCTURAL STRAIN SENSING OPTICAL CABLE

BACKGROUND

The disclosure relates generally to structural strain sensing and more particularly to optical fiber cables for sensing strain within a structure. Measurement of strain within a structure, such as a bridge, dam, building, roadway, etc., provides an indication of the health or structural integrity of the structure. Strain within an optical fiber can be measured by measuring the change in a transmission property of a signal along the optical fiber (e.g., the Brillouin scattering of the fiber).

No admission is made that any reference cited herein constitutes prior art. Applicant expressly reserves the right to challenge the accuracy and pertinence of any cited documents.

SUMMARY

One embodiment of the disclosure relates to a strain-sensing cable. The strain sensing cable includes a jacket, a first optical fiber and a second optical fiber. The first optical fiber is located within the jacket and is configured to experience a strain applied to the cable and the temperature of the cable. The second optical fiber is located within the jacket and is isolated from the strain applied to the cable and is configured to experience the temperature of the cable.

An additional embodiment of the disclosure relates to an optical fiber cable configured to sense strain applied to the cable. The cable includes an outer jacket, a first strengthening member embedded in the outer jacket extending between a first end and a second end of the cable. The cable also includes a first optical fiber embedded in the outer jacket and extending between the first end and the second end of the cable, and the first fiber is configured to experience the strain applied to the cable and the temperature of the cable. The cable includes a tube or cavity embedded in the outer jacket and extending between the first end and the second end of the cable, and the tube or cavity has an interior surface defining a lumen. The cable includes a second optical fiber extending between the first end and the second end of the cable, and the second optical fiber is located within the lumen of the tube such that the second optical fiber is isolated from the strain applied to the cable. The length of the second optical fiber located between the first end and the second end of the cable is greater than the length of the first optical fiber located between the first end and the second end of the cable. The cross sectional area of at least one of the strength members is greater than the cross sectional area of at least one of the optical fibers.

An additional embodiment of the disclosure relates to a strain-sensing optical fiber cable configured to be coupled to a structure. The cable includes an outer jacket, a strengthening member embedded in the outer jacket, and a strain-sensing optical fiber coupled to the material of the outer jacket and extending between a first end and a second end of the cable. The strain-sensing fiber is embedded within the material of the outer jacket within 2 mm of the strengthening member such that the strain-sensing optical fiber experiences strain when the structure experiences strain. The cable includes a tube or cavity embedded in the material of the outer jacket and extending between a first end and a second end of the cable, and the tube or cavity has an interior surface defining a lumen. The cable includes a temperature-sensing optical fiber extending between a first end and a second end of the cable, and the second optical fiber is located within the lumen of the tube such that the temperature sensing fiber is isolated from strain experienced by the structural member. The length of the second optical fiber located within the lumen of the tube is greater than the length of the first optical fiber coupled to the outer jacket.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical cable configured to sense strain are shown. In general, the strain-sensing cable is attached to a structure (e.g., a bridge, dam, roadway, building, ship, aircraft, etc.) in a manner that the strain-sensing cable is permitted to experience the same strain as the structure. Generally, the strain-sensing cables disclosed herein include at least two optical fibers coupled to or located within a single outer cable jacket. The first optical fiber is configured to experience both the strain applied to the cable (which for example is indicative of the strain within the structure to which the strain-sensing cable is coupled) and the temperature of the cable. A second optical fiber is configured to experience the temperature of the cable, but is isolated from the strain applied to the cable.

Strain within the first optical fiber is measured by transmitting a signal along the first optical fiber and by measuring the change in a transmission property of the signal along the first optical fiber. The change in the certain transmission properties within an optical fiber can be correlated to strain within the fiber. However, both strain within the first fiber and the temperature of the first fiber can affect the detected transmission property. Thus, to determine the effect that the temperature of the fiber has on the transmission property, the signal is also transmitted along the second optical fiber and the transmission property experienced by the signal along the length of the second optical fiber is measured.

Because the second optical fiber is isolated from strain and thus only experiences temperature of the cable, the measured change in transmission property along the second optical fiber indicates the temperature effect. With the effect of the temperature on the transmission property determined, the effect of strain on the transmission property measured from the first optical fiber can be isolated and correlated with the strain present in the first fiber. One particular transmission property that can be measured is the change of Brillouin scattering experienced by the signal along the length of the optical fibers. Thus, in this manner, a single optical cable is provided that allows for an accurate strain measurement by providing a strain experiencing optical fiber and a strain-isolated optical fiber within a single cable.

In various embodiments, the strain-sensing optical cable also includes a number of features that relate to strain detection, to handling of the cable, to installation of the cable to the structure and to access to the fibers within the cable. For example, in various embodiments, the strain-sensing optical cable also includes one or more strength members located within the cable jacket positioned adjacent the strain sensing optical fibers. The strength members may act to resist crushing forces (e.g., if the cable is embedded in concrete of a structure) and may also facilitate handling and installation by providing strength and durability to the cable. Access features may allow the user to easily access one or more of the optical fibers of the cable to facilitate exposure of the fibers for coupling to the strain-sensing electronics. The access features may be created by a shape feature in the cable jacket or by a material feature within the cable jacket such as by extrusion of a second jacket material of lower strength between the sensing fiber and the outer surface of the cable jacket.

Figure 1:
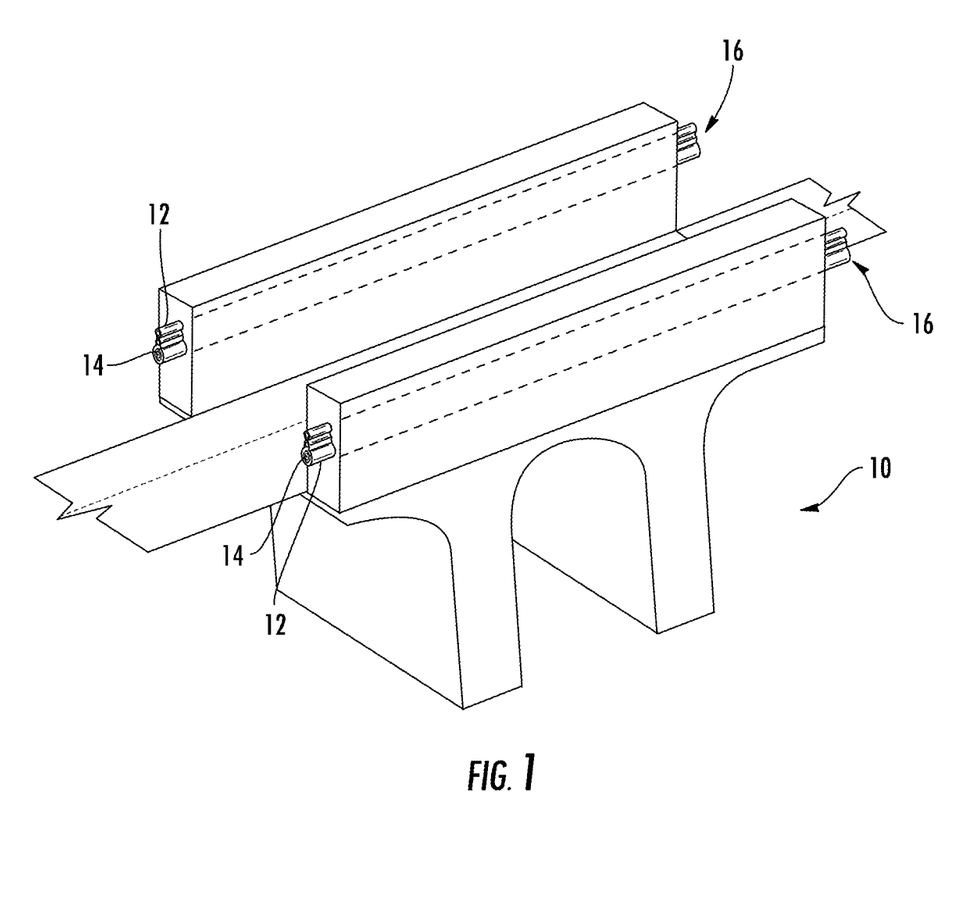
FIG. 1 shows a strain-sensing cable coupled to a structure according to an exemplary embodiment.

Referring to FIG. 1, a structure, shown as bridge 10, includes strain sensing cables 12 coupled to bridge 10. In the embodiment shown, cables 12 are shown embedded within the material (e.g., concrete) of walls of bridge 10 such that strain experienced by the walls of bridge 10 is also experienced by cable 12, and more specifically, by the strain sensing optical fiber of cable 12, as explained below. While the exemplary embodiment of FIG. 1 shows cable 12 coupled to a wall of bridge 10, cable 12 can be coupled to a wide variety of structures in various ways such that cable 12 experiences the strain of the portion of the structure cable 12 is coupled to. For example, cable 12 may be embedded in the material (e.g., concrete) of a structural member of a bridge, roadway, dam, building foundation, support columns, etc. In addition, cable 12 may be coupled to a structural member (e.g., an I-beam support in a building, a support cable of a suspension bridge, a pipe, an oil or natural gas pipeline, etc.) in a manner that the cable experiences the strain experienced by the structural member. In other embodiments, the structural elements may be structural members of other structures, such as ships, aircraft, trains, etc. For example, cable 12 may be coupled to the structural spars or the hull of a ship to detect strain of these structural elements. As another example, cable 12 may be attached to an aircraft wing or fuselage to detect strain. Cable 12 could be coupled to the wall of storage containers such as large oil tanks in an oil or gas distribution center. Cable 12 could be embedded in earthen dams to detect the strain that results from soil compaction or movement. Cable 12 could be coupled to tall towers such as radio transmission towers to detect the strain that results from the flexing of the tower. Cable 12 could be coupled to the walls of tunnels, such as railway or subway tunnels or mine shafts, to detect the strain that results from earth movement around the tunnel.

As shown in the exemplary embodiment, cables 12 may have at least one end, shown as end 14, exposed or accessible while the rest of the cable is coupled to (e.g., embedded within) the structure. Accessible ends 14 allow the appropriate electronic devices to be coupled to cable 12 to apply the signals that are used to detect the strain within the cables. In some embodiments, the end of cable 12 opposing end 14, shown as end 16, is also exposed allowing the appropriate electronics to be coupled to either end or both ends of cable 12.

Figure 4:
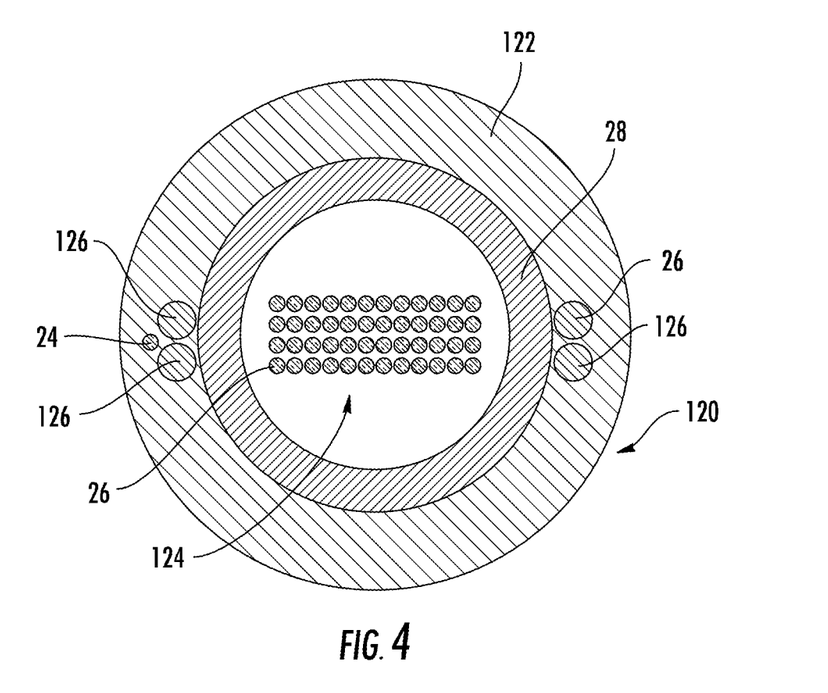
FIG. 4 shows a strain-sensing cable according to an exemplary embodiment.

In some embodiments, cable 12 may include connector structures located at end 14 and/or end 16 for connecting cable 12 to the appropriate electronics. In some embodiments, cables 12 may be coupled directly to a structure monitoring system that may be monitored continuously from a central location. In other embodiments (e.g., as shown in FIG. 4), cable 12 may be a fiber optic communications cable that includes a strain-sensing optical fiber that is integrated with the telecommunications network allowing strain to be measured from a central location or hub in the telecommunication network.

Figure 2:
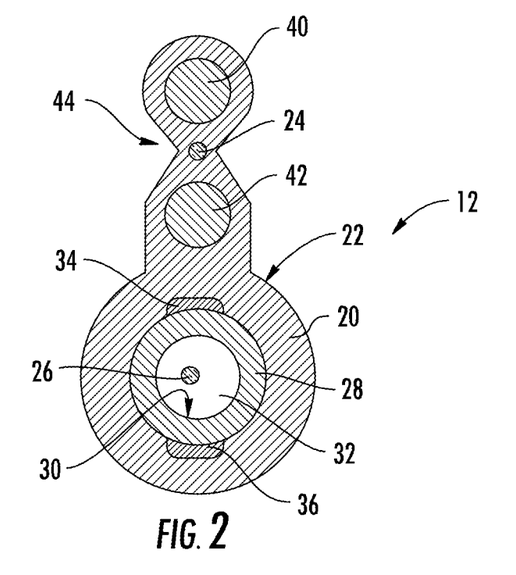
FIG. 2 shows a strain-sensing cable according to an exemplary embodiment.

Referring to FIG. 2, a cross-sectional view of strain-sensing cable 12 is shown according to an exemplary embodiment. Cable 12 includes a cable jacket, outer jacket or sheath, shown as jacket 20. Jacket 20 is an extruded material, e.g., an extruded polymer material, that supports the other components of cable 12 which may be extruded over the other components to form cable 12. Jacket 20 is the outer layer of cable 12 and forms the outer sidewall or axially extending outer surface 22 of cable 12. As shown in FIG. 1, when coupled to a structure, such as bridge 10, outer surface 22 is the surface of cable 12 that engages or interfaces with the structure. In a specific embodiment, jacket 20 is an extruded medium density polyethylene material.

In various embodiments, the material of jacket 20 may be selected based on the type of structural member, the type of structure, the environment, etc. that cable 12 will reside in. For example, in one embodiment, cable 12 is configured to be coupled to vertical structural beams of a building, and in this embodiment, jacket 20 may be formed from a material providing riser burn resistance. As other examples, jacket 20 may be waterproof if cable 12 is intended for use in wet areas, and/or jacket 20 may be corrosion resistant if cable 12 is intended for use near salt water or in climates where salt is applied to road ways. The material of jacket 20 may be any material used in cable manufacturing such as polyethylene, polyvinyl chloride (PVC), polyvinylidene difluoride (PVDF), nylon, polyester or polycarbonate and their copolymers. Other materials may be used for jacket 20 as indicated by the environments in which the cable is to be used. For example high temperature applications such as deep oil wells could use materials such as polyethylene terephthalate, polyphenylene sulfide, poly imides, or polyetherether ketone.

Cable 12 includes a first optical fiber, shown as strain-sensing optical fiber 24, coupled to jacket 20. As shown in FIG. 2, strain-sensing optical fiber 24 is located within jacket 20, and specifically, is embedded within the material of jacket 20. In this embodiment, an outer surface of strain-sensing optical fiber 24 is in contact with and is coupled to the material of jacket 20 such that strain experienced by cable 12 (and the structure to which cable 12 is connected) is experienced by strain-sensing optical fiber 24. In one such embodiment, optical fiber 24 extends between first end 14 and second end 16 of cable 12 (shown in FIG. 1), and the length of optical fiber 24 is substantially the same as the length of cable 12. Thus, as cable 12 experiences strain, strain-sensing optical fiber 24 also experiences strain.

Cable 12 also includes a second optical fiber, shown as temperature-sensing optical fiber 26, located within jacket 20. Temperature-sensing optical fiber 26 is located within jacket 20 adjacent to and in close proximity to strain-sensing optical fiber 24 such that the temperature of fiber 26 is substantially the same (e.g., within 1 degree C., within 2 degrees C.) as the temperature of optical fiber 24. In contrast to fiber 24, temperature-sensing optical fiber 26 is configured and arranged within cable 12 such that fiber 26 is isolated from the strain applied to cable 12. In one embodiment, fiber 26 is isolated from the strain applied to cable 12 over the intended strain-sensing range of cable 12. Thus, cable 12 provides both a strain-sensing fiber 24 and a temperature-sensing fiber 26 within a single cable jacket 20. This allows a single cable 12 to be installed as desired on the structural member while providing both sensing functions of fibers 24 and 26.

In the embodiment of FIG. 2, temperature-sensing optical fiber 26 is isolated from strain by having a length that is greater than the length of fiber 24 (e.g., an excess fiber length or EFL). Specifically, temperature-sensing optical fiber 26 extends between first end 14 and second end 16 of cable 12 (shown in FIG. 1) similar to fiber 24 explained above. However the axial length of temperature-sensing optical fiber 26 is greater than the axial length of fiber 24, such that as strain is applied to cable 12, the extra length of fiber 26 extends or straightens within tube 28. In this arrangement, fiber 26 extends instead of experiencing the strain, but because fiber 24 is the same length as cable 12, fiber 24 experiences the strain applied to cable 12.

The difference in lengths between fibers 26 and 24 for a particular cable 12 will vary based on the strain expected to be experienced by the cable in a particular application. For example, if cable 12 is intended for a high strain environment, the length difference between fiber 26 and fiber 24 may be greater than in a cable intended for a low strain environment. In one embodiment, the length of fiber 26 is between 0.03% and 1% greater than the length of fiber 24, specifically between 0.1% and 0.8% greater than the length of fiber 24, and more specifically, between 0.3% and 0.5% greater than the length of fiber 24. In one embodiment, cable 12 includes an intermittent web attaching tube 28 to cable 12 that allows tube 28 to be longer than fiber 24, such as disclosed in U.S. Pat. No. 6,356,690, which is incorporated herein by reference in its entirety.

In the exemplary embodiment of FIG. 2, cable 12 includes a tube 28, and temperature-sensing optical fiber 26 is located within tube 28. Tube 28 includes an inner surface 30 that defines a lumen 32 and temperature-sensing optical fiber 26 is located within lumen 32. Tube 28 also includes an outer surface that is coupled to the material of jacket 20, and in the embodiment shown, tube 28 is embedded within the material of jacket 20. Fiber 26 resides loosely within tube 28 such that lumen 32 of tube 28 provides the space to contain the extra length of fiber 26 within cable 12. Lumen 32 of tube 28 also provides an area to allow fiber 26 to lengthen or extend under strain without being trapped, pinched or otherwise impeded as cable 12 deforms under strain.

Generally, tube 28 may be formed from a material with sufficient rigidity to preserve lumen 32 within jacket 20 and after cable 12 is attached to or embedded in the structure. In this manner, tube 28 acts to preserve the extra length of fiber 26 within tube 28 during installation of cable 12. In various embodiments, tube 28 may be metal, plastic or other suitable material. In some embodiments, lumen 32 may include a gel material supporting fiber 26 within tube 28 without transferring strain to fiber 26.

In various embodiments, cable 12 may include one or more structures that supports tube 28 within outer jacket 20. As shown, cable 12 includes a first tube strengthening member 34 and a second tube strengthening member 36. Strengthening members 34 and 36 generally act to provide structural support to tube 28, and in one embodiment, strengthening members 34 and 36 act to resist collapse of tube 28 after cable 12 has been attached to the structure.

In some embodiments, tube 28 may be made from a thermoplastic material, such as polypropylene, that may be susceptible to stretching under the pressure and heat present as jacket 20 is extruded over tube 28. Because stretching of tube 28 during jacket extrusion may take up the excess length of fiber 26, strengthening members 34 and 36 may resist or prevent stretching tube 28 during jacket extrusion and thereby act to preserve the excess length of fiber 26 within cable 12. In various embodiments, strengthening members 34 and 36 may be cylindrical or rod-like structures that extend the length of cable 12. In other embodiments, strengthening members 34 and 36 may be discreet sections of plating or reinforcement members coupled at selected intervals along the length of tube 28. Strengthening members 34 and 36 may generally be formed from a rigid material more rigid than the material of tube 28, and in various embodiments, tube strengthening members 34 and 36 may be metal, braided steel, glass reinforced plastic, fiber glass, fiber glass yarns or other suitable material.

Cable 12 may also include one or more strengthening members, shown as first cable strengthening member 40 and second cable strengthening member 42, that provide strength and rigidity to cable 12. The strength and rigidity provided by strengthening members 40 and 42 may generally facilitate handling of cable 12 during installation of the cable to the structure and may also act to resist crushing forces (e.g., radially inward directed forces) that may be applied to the cable in some installations, such as being embedded within concrete.

In the embodiment shown, strengthening members 40 and 42 are elongate, generally cylindrical or rod-like members embedded within the material of jacket 20. In these embodiments, strengthening members 40 and 42 have outer surfaces that are coupled to the material of jacket 20. Strengthening members 40 and 42 may generally be formed from a rigid material more rigid than the material of outer jacket 20, and in various embodiments, strengthening members 40 and 42 may be metal, braided steel, glass-reinforced plastic, fiber glass, fiber glass yarns or other suitable material.

In various embodiments, a cross-sectional size (e.g., diameter, width, cross-sectional area, etc.) of strengthening members 40 and 42 is greater than the corresponding cross-sectional size of strain sensing fiber 24. In various embodiments, the cross-sectional area of strengthening members 40 and 42 is greater than the cross-sectional area of strain-sensing fiber 24. For example, in some embodiments, the cross-sectional area of strengthening members 40 and 42 is more than two times the cross-section area of strain-sensing fiber 24, more than four times the cross-sectional area of strain-sensing fiber 24 and more than 10 times the cross-sectional area of strain-sensing fiber 24. In various embodiments, sensing fiber 24 is generally less than 0.5 mm in diameter, with a typical range of 0.125 mm to 0.25 mm. The strengthening members are generally greater than 0.5 mm in diameter, with a typical range of 1.0 mm to 1.6 mm. The size of the optical fibers may be adjusted to achieve selected properties of the fiber such as signal transmission properties and bend performance properties. The size of the strengthening members may be adjusted to achieve specific mechanical properties of the cable such as tensile strength and crush resistance.

As noted above, strengthening members 40 and 42 may be located within jacket 20 adjacent to strain-sensing fiber 24 such that strengthening members 40 and 42 act to protect fiber 24 from radial inwardly directed force such as may be experienced by cable 12 embedded in concrete. In the embodiment shown, fiber 24 is located between strengthening members 40 and 42. In the orientation shown in FIG. 2, fiber 24 and strengthening members 40 and 42 are positioned along a first cross-sectional axis of cable 12 (e.g., the vertical axis in FIG. 2) such that member 40 is above fiber 24 and member 42 is located below fiber 24.

In various embodiments, the shortest distance between the uppermost portion of the outer surface of fiber 24 and the lowermost portion of the outer surface of strengthening member 40 is less than 3 mm, is less than 2 mm, is less than 1 mm or is less than 0.5 mm. In various embodiments, the shortest distance between the lowermost portion of the outer surface of fiber 24 and the uppermost portion of the outer surface of strengthening member 42 is less than 3 mm, is less than 2 mm, is less than 1 mm or is less than 0.5 mm.

In various embodiments, fiber 24 may be positioned equidistant from strengthening members 40 and 42 such that the shortest distance between the lowermost portion of the outer surface of fiber 24 and the uppermost portion of the outer surface of strengthening member 42 is the substantially the same as the shortest distance between the uppermost portion of the outer surface of fiber 24 and the lowermost portion of the outer surface of strengthening member 40. As shown in FIG. 2, in these embodiments, material of jacket 20 resides in the areas between fiber 24 and strengthening members 40 and 42. In another embodiment, strengthening members 40 and 42 may be adjoining fiber 24 such that the outer surfaces of members 40 and 42 contact the outer surface of fiber 24.

In various embodiments, cable 12 may be configured to facilitate access to fiber 24 by facilitating removal or separation of the material of jacket 20 from around fiber 24. Such access to fiber 24 may be used to couple fiber 24 to the electronics for reading the strain within cable 12. In the embodiment of FIG. 2, the width of jacket 20 decreases at position 44 of fiber 24 such that the width of cable 12 at fiber 24 is the lowest width of cable 12. In this embodiment, the outer surface of jacket 20 tapers inward both above and below fiber 24 as the distance to fiber 24 decreases. In other embodiments, the width decrease may not be non-tapered, for example in the form of a slot formed in jacket 20 adjacent fiber 24. In various embodiments, the width of cable 12 at fiber 24 may be less than 75% the greatest width of cable 12, may be less than 50% the greatest width of cable 12, or may be less than 30% the greatest width of cable 12.

In the cable arrangement shown in FIG. 2, strengthening members 40 and 42 are positioned on either side of the narrower jacket portion located at fiber 24. This placement of strengthening members 40 and 42 acts to facilitate access to fiber 24 because the user may grip cable 12 at strengthening members 40 and 42 as the jacket is pulled away to access fiber 24. In some embodiments, cable 12 may include additional structures to facilitate access to fiber 24, such as for example, a frangible tear feature, scoring or perforations that act to facilitate separation of jacket 20 at fiber 24.

Figure 3:
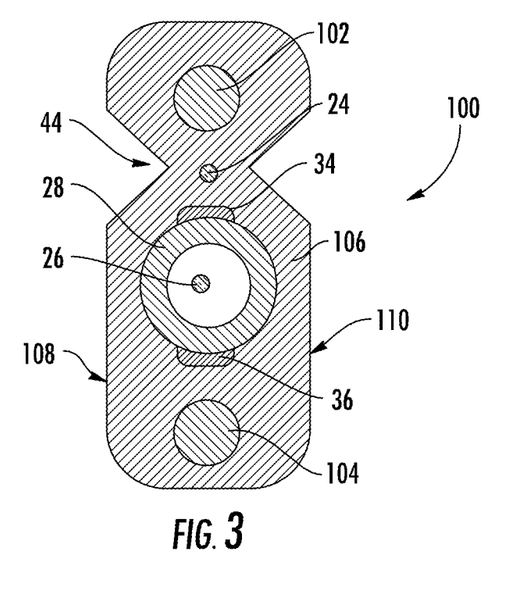
FIG. 3 shows a strain-sensing cable according to an exemplary embodiment.

Referring to FIG. 3, a strain-sensing cable 100 is shown according to an exemplary embodiment. Cable 100 is substantially the same as cable 12 except as discussed herein. Cable 100 includes a first strengthening member 102 and a second strengthening member 104, similar to strengthening members 40 and 42 discussed above. Cable 100 also includes an outer jacket 106 in which the components of cable 100 are supported and embedded.

Unlike cable 12, cable 100 is arranged such that that strain sensing fiber 24, temperature sensing fiber 26 and tube 28 are located between strengthening members 102 and 104. Specifically, in the embodiment of FIG. 3, strengthening member 102 is located on one side (e.g., above in the orientation of FIG. 3) of strain sensing fiber 24, temperature sensing fiber 26 and tube 28, and strengthening member 104 is located on the other side (e.g., below in the orientation of FIG. 3) of strain sensing fiber 24, temperature sensing fiber 26 and tube 28. Thus, strengthening members 102 and 104 are the outer most elongate elements of cable 100.

In this embodiment, strengthening member 102 acts to support cable 100 around strain-sensing fiber 24 and also acts to facilitate separation of outer jacket 106 from fiber 24 to facilitate access to fiber 24, as discussed above. With strengthening member 104 located to the outside of tube 28, strengthening member 104 acts to support the portion of outer jacket 106 below tube 28.

In various embodiments, the shortest distance between the uppermost portion of the outer surface of fiber 24 and the lowermost portion of the outer surface of strengthening member 102 is less than 3 mm, is less than 2 mm, is less than 1 mm or is less than 0.5 mm. In various embodiments, the shortest distance between the lowermost portion of the outer surface of tube 28 and the uppermost portion of the outer surface of strengthening member 104 is less than 3 mm, is less than 2 mm, is less than 1 mm or is less than 0.5 mm. In various embodiments, the cross-sectional area of strengthening members 102 and 104 is more than two times the cross-sectional area of strain-sensing fiber 24, is more than four times the cross-sectional area of strain-sensing fiber 24 and is more than 10 times the cross-sectional area of strain-sensing fiber 24.

In the embodiment shown in FIG. 3, outer jacket 106 of cable 100 includes one or more substantially planar outer surfaces, shown as first planar surface 108 and second planar surface 110. As shown, planar surface 108 is substantially parallel to planar surface 110 and defines the widest dimension of cable 100. In the embodiment of FIG. 3, planar surfaces 108 and 110 extend the length of cable 100. Planar surfaces 108 and 110 may facilitate coupling of cable 100 to a structural member by providing a planar surface to engage or contact a planar surface of the structural member (e.g., the surface of an I-beam) monitored by cable 100.

Referring to FIG. 4, a strain-sensing cable 120 is shown according to an exemplary embodiment. Cable 120 includes an outer jacket 122, and a tube 28 is located within outer jacket 122. In the embodiment of FIG. 4, outer jacket 122 is substantially circular in cross-section, and tube 28 is centrally located and coaxial with outer jacket 122. An array of optical fibers 124 is located within tube 28. At least one of the fibers of array 124 is isolated from strain applied to cable 120 and functions as temperature-sensing fiber 26. In one embodiment, the fibers of array 124 are telecommunication fibers configured to carry telecommunication signals along the length of cable 120.

Strain-sensing cable 120 includes a plurality of strengthening members 126 and strain-sensing fiber 24. Strengthening members 126 are positioned along the outer surface of tube 28 and act to reinforce tube 28 similar to strengthening members 34 discussed above. Strain-sensing fiber 24 is embedded within the material of outer jacket 122 and positioned adjacent to strengthening members 126 such that strengthening members 126 act to support outer jacket 122 around fiber 24.

In various embodiments of cable 120, the shortest distance between the innermost portion of the outer surface of fiber 24 and the outermost portion of the outer surface of strengthening members 126 is less than 3 mm, is less than 2 mm, is less than 1 mm or is less than 0.5 mm. In various embodiments, the cross-sectional area of strengthening members 126 is more than two times the cross-sectional area of strain-sensing fiber 24, is more than four times the cross-sectional area of strain-sensing fiber 24 and is more than 10 times the cross-sectional area of strain-sensing fiber 24.

Figure 5:
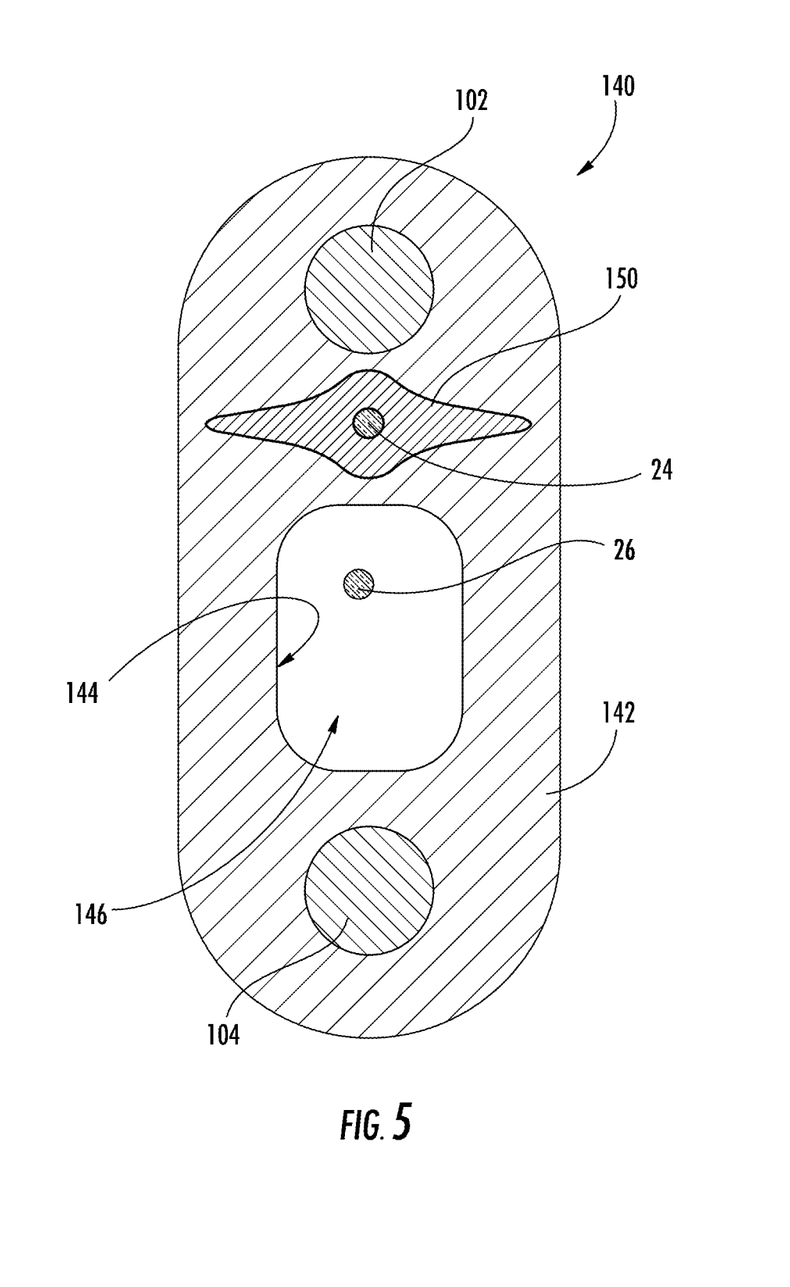
FIG. 5 shows a strain-sensing cable according to an exemplary embodiment.

Referring to FIG. 5, a strain-sensing cable 140 is shown according to an exemplary embodiment. Cable 140 is substantially the same as cable 120 except as discussed herein. Cable 140 includes an outer sheath or jacket 142. Outer jacket 142 includes an inner surface 144 that defines a lumen 146. Temperature sensing fiber 26 is located within lumen 146, and lumen 146 acts much like the lumen of the tube 28 discussed above, in that lumen 146 provides the space for temperature sensing fiber 26 to elongate instead of experiencing stress. In one embodiment, lumen 146 is a hollow cavity formed during extrusion of the material of jacket 142, and that extends between the first and second ends of cable 140.

Further, cable 140 also includes an access feature 150. Access feature 150 is an elongate section of lower strength jacket material (e.g., lower strength than the material of outer jacket 142). Strain sensing fiber 24 is located within or embedded within the material of access feature 150. Access feature 150 operates in manner similar to the tapered section of jacket material at position 44 of cable 12 discussed above, in that access feature 150 provides a weakened area that allows jacket 142 to be separated to access strain sensing fiber 24. In the embodiment shown, access feature 150 is an elongate section of material that extends between the first and second ends of cable 140.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical fiber may comprise an inner primary coating and an outer secondary coating. Optical fiber coatings may be applied in concentric layers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A strain-sensing cable comprising:
   a jacket having a first length extending between a first end and a second end of the cable, wherein the jacket includes a polymer layer defining an outermost surface of the cable;
   a first optical fiber embedded within the polymer layer of the jacket such that the jacket surrounds the first optical fiber, the first optical fiber configured to experience a strain applied to the cable and a temperature of the cable; and
   a second optical fiber located within the jacket, wherein the second optical fiber is isolated from the strain applied to the cable and is configured to experience the temperature of the cable, and
   wherein a length of the first optical fiber between the first end and the second end of the cable is equal to the first length and a length of the second optical fiber between the first end and the second end of the cable is greater than the first length.

2. The strain-sensing cable of claim 1, further comprising an interior surface defining a lumen;
   wherein the second optical fiber is located within the lumen isolating the second optical fiber from the strain applied to the cable.

3. The strain-sensing cable of claim 2, wherein the first optical fiber is located outside of the lumen; and
   further wherein the interior surface is the interior surface of a tube embedded in the material of the jacket.

4. The strain-sensing cable of claim 3, further comprising:
   a first strengthening member coupled to an outer surface of the tube, wherein the jacket is an extruded polymer layer;
   wherein the jacket surrounds the second optical fiber and the tube, wherein the first strengthening member resists stretching of the tube during extrusion of the jacket.

5. The strain-sensing cable of claim 4, further comprising a second strengthening member coupled to an outer surface of the tube, wherein the second strengthening member resists stretching of the tube during extrusion of the jacket.

6. The strain-sensing cable of claim 1, wherein the length of the second optical fiber is between 0.03% and 1% greater than the length of the first optical fiber.

7. The strain-sensing cable of claim 1, further comprising:
   a first strengthening member embedded in a polymer material of the polymer layer of the jacket;
   wherein the first strengthening member is formed from a material that is more rigid than the polymer material of the jacket;
   wherein the cross-sectional area of the first strengthening member is greater than twice the cross-sectional area of the first optical fiber.

8. The strain-sensing cable of claim 7, wherein an outer surface of the jacket tapers inwardly at the position of the first optical fiber such that a cross-sectional dimension of the cable at the position of the first optical fiber is less than a cross-sectional dimension of the cable at the position of the second optical fiber.

9. The strain-sensing cable of claim 1, further comprising:
a tube embedded in the polymer layer of the jacket, the tube having an interior surface defining a lumen; and
an array of a plurality of aligned optical fibers located within the tube, wherein the second optical fiber is one of the fibers of the array;
wherein the first optical fiber is located outside of the tube.

10. An optical fiber cable configured to sense strain applied to the cable, the cable comprising:
an outer jacket;
a first strengthening member embedded in the outer jacket extending between a first end and a second end of the cable;
a first optical fiber embedded in the outer jacket and extending between the first end and the second end of the cable, the first fiber configured to experience the strain applied to the cable and the temperature of the cable;
an interior surface defining a lumen extending between the first end and the second end of the cable; and
a second optical fiber extending between the first end and the second end of the cable, the second optical fiber located within the lumen such that the second optical fiber is isolated from the strain applied to the cable;
wherein the length of the second optical fiber located between the first end and the second end of the cable is greater than the length of the first optical fiber located between the first end and the second end of the cable;
wherein the cross-sectional area of the first strengthening member is greater than the cross-sectional area of at least one of the first optical fiber and the second optical fiber.

11. The optical fiber cable of claim 10, further comprising:
a tube embedded in the outer jacket and extending between the first end and the second end of the cable;
wherein the interior surface defining the lumen is an interior surface of the tube;
wherein the outer jacket is an extruded polymer layer defining an outer surface of the cable and surrounding the first optical fiber and the tube.

12. The optical fiber cable of claim 11, wherein an outer surface of the first optical fiber contacts the extruded polymer of the outer jacket and an outer surface of the tube contacts the extruded polymer of the outer jacket; wherein the first optical fiber is located within 2 mm of the first strengthening member.

13. The optical fiber cable of claim 10, wherein the first strengthening member is an elongated cylindrical members and is formed from a material that is more rigid than the material of the outer jacket.

14. The optical fiber cable of claim 13, wherein the first optical fiber is located within 2 mm of the first strengthening member.

15. The optical fiber cable of claim 14, further comprising a second strengthening member wherein the lumen is located between the first strengthening member and the second strengthening member.

16. The optical fiber cable of claim 13, wherein the cross-sectional width of the cable at the position of the first optical fiber is less than the cross-sectional width of the cable at the position of the first strengthening member.

17. The optical fiber cable of claim 10, wherein an outer surface of the outer jacket is coupled to a structural member of a structure such that strain experienced by the structural member is experienced by the cable.

18. A strain-sensing optical fiber cable configured to be coupled to a structure, the cable comprising:
an outer jacket;
a strengthening member embedded in the outer jacket;
a strain-sensing optical fiber embedded in the material of the outer jacket and extending between a first end and a second end of the cable, the strain-sensing fiber embedded within the material of the outer jacket within 2 mm of the strengthening member such that the strain-sensing optical fiber experiences strain when the structure experiences strain;
an interior surface located in the material of the outer jacket and extending between a first end and a second end of the cable, the interior surface defining a lumen; and
a temperature-sensing optical fiber extending between a first end and a second end of the cable, the temperature-sensing optical fiber located within the lumen such that the temperature sensing fiber is isolated from strain experienced by the structure, wherein the length of the temperature-sensing optical fiber located within the lumen is greater than the length of the first optical fiber coupled to the outer jacket.

19. The strain-sensing optical fiber cable of claim 18, wherein the strain-sensing optical fiber is located outside of the lumen.

* * * * *